United States Patent [19]

Vacon et al.

[11] Patent Number: 5,151,895
[45] Date of Patent: Sep. 29, 1992

[54] TERMINAL SERVER ARCHITECTURE

[75] Inventors: Gary Vacon, Melrose; John A. Visser, Wakefield; Willem A. H. Engelse, Townsend; Stephen D. Metzger, Lancaster, all of Mass.

[73] Assignee: Digital Equipment Corporation, Maynard, Mass.

[21] Appl. No.: 546,104

[22] Filed: Jun. 29, 1990

[51] Int. Cl.⁵ .............................................. H04J 3/02
[52] U.S. Cl. .................................................. 370/85.1
[58] Field of Search ........................... 370/85.1, 91, 61

[56] References Cited

U.S. PATENT DOCUMENTS

| | | |
|---|---|---|
| 4,225,919 | 9/1980 | Kyu et al. |
| 4,455,647 | 6/1984 | Gueldner |
| 4,547,880 | 10/1985 | De Vita et al. ........................ 370/61 |
| 4,623,997 | 11/1986 | Tulpule |
| 4,695,997 | 9/1987 | Montanari et al. ................... 370/13 |
| 4,706,081 | 11/1987 | Hart et al. ............................ 370/61 |
| 4,872,159 | 10/1989 | Hemmady et al. ................... 370/61 |
| 4,887,075 | 12/1989 | Hirasawa et al. .................. 370/85.1 |

FOREIGN PATENT DOCUMENTS

| | | |
|---|---|---|
| 64347 | 10/1982 | European Pat. Off. |
| 185122 | 6/1986 | European Pat. Off. |

*Primary Examiner*—Douglas W. Olms
*Assistant Examiner*—T. Samuel
*Attorney, Agent, or Firm*—Arnold, White & Durkee

[57] ABSTRACT

A terminal server architecture includes a central processing unit (CPU), a data movement module, local area network (LAN) interface and a plurality of connected terminals. The CPU manages pointers to data using command status registers to instruct the data movement module to actually perform data movement between the terminals and the LAN.

5 Claims, 6 Drawing Sheets

FIG. 1
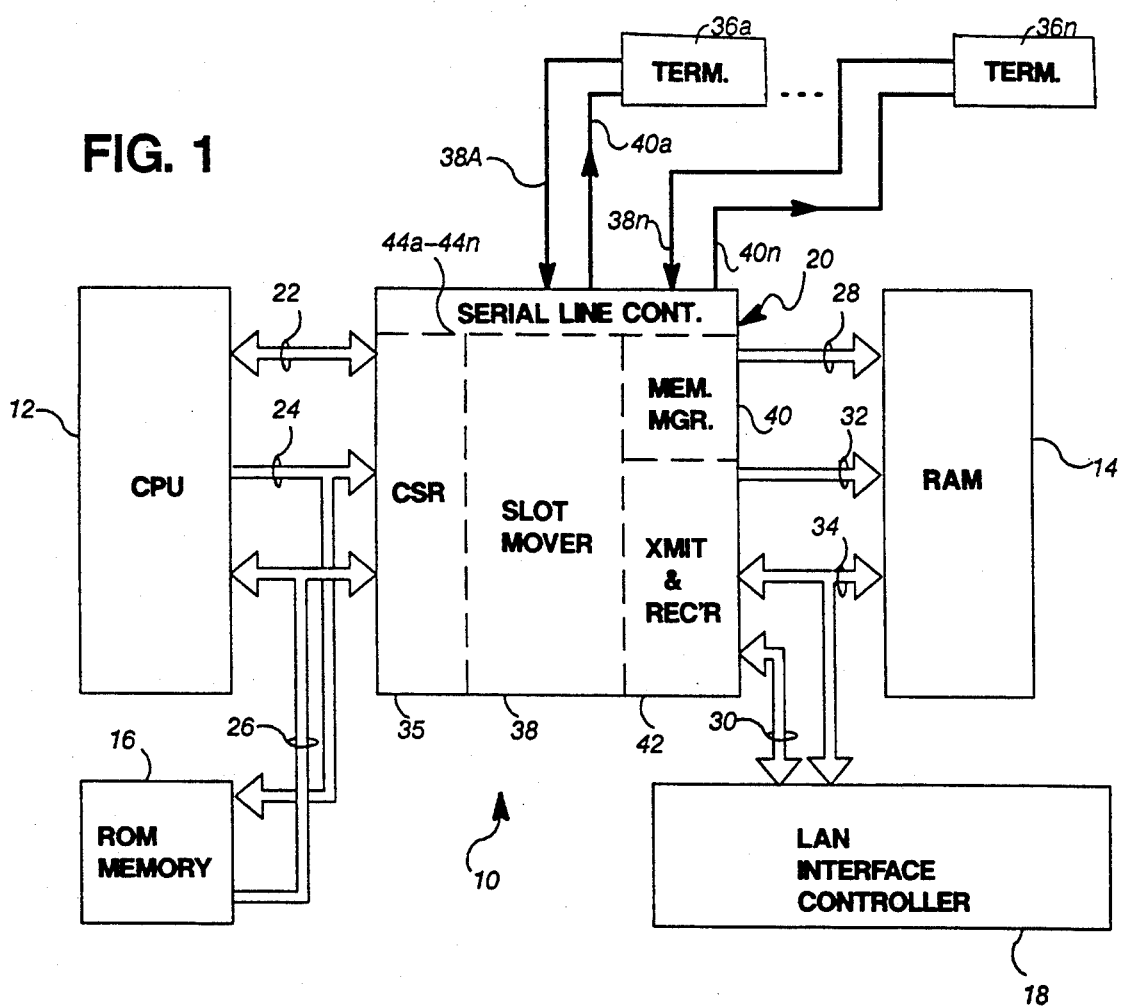
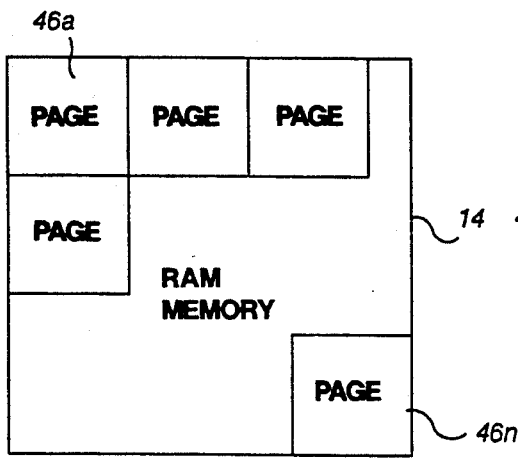
FIG. 2a
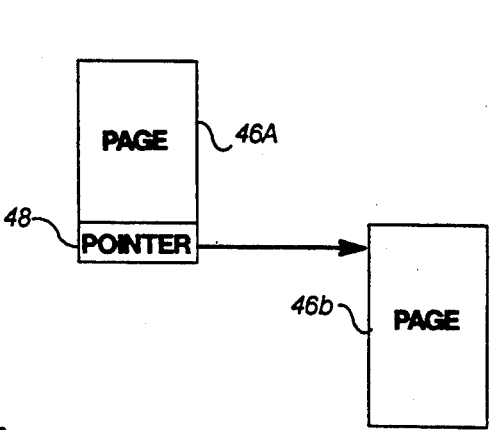
FIG. 2b

TERMINAL SERVER ARCHITECTURE

FIELD OF THE INVENTION

This invention relates to terminal server architectures used in data transmission networks. In particular, the present invention relates to a terminal server architecture in which the controller does not execute direct data movement operations.

BACKGROUND OF THE INVENTION

Local Area Networks (LANs) provide a communication facility for data exchange among devices within a moderately sized geographical area. A typical network includes a number of host computers, a number of workstations and other LAN compatible devices arranged in the proximity of each other for use in office automation, distributed data processing and other situations requiring connection to a common local communication medium. It is, of course, desired that the network operate in an economical fashion with the ability for carrying high system data throughput, while accommodating bursty traffic at high peak data rates.

Terminal server devices provide connection between terminals which operate asynchronously to transmit data to and receive data from the LAN. A terminal server typically is dedicated to a plurality of terminals via serial data lines originating from the terminal server and terminating at respective terminals. The terminal server also provides a node for connection to the LAN. The LAN provides for packet data transmission between the terminal server and the host computer. In this way, communication is established between a number of terminals and host computers.

Previously proposed terminal server configurations typically employ a powerful central processing unit (CPU), memory, a LAN interface device having a direct memory access (DMA) controller, and a plurality of asynchronous receiver/transmitter devices, each dedicated to respective terminals linked to the terminal server device.

The terminal server performs data management and movement as follows with this type of architecture. For transmission of data from the LAN to a selected terminal, the LAN interface DMA controller directly accesses the terminal server memory and moves incoming packets of data to memory. The CPU thereafter executes appropriate instructions to transfer asynchronous data, one character at a time, from memory to a selected asynchronous transmitter/receiver which, in turn, supplies the data to the desired terminal. When data is transmitted from a terminal to the LAN, the CPU executes instructions for moving data received from the asynchronous transmitter/receiver, one character at a time, to a location in memory. The LAN interface DMA controller thereafter moves data packets from memory to the LAN. In this way, the host computer receives data from the sender terminal. The terminal server CPU, in addition, handles all protocol concerns, memory management, and user interface.

While these terminal server arrangements perform satisfactorily in many instances, a number of practical problems frequently arise. Principal among these is cost for the implementation of necessary components in the terminal server device. Most of the CPU clock cycles are dedicated to execution of data movement inasmuch as the primary function of any terminal server is to pass data between respective terminals and the LAN. Accordingly, powerful processors and supporting logic are required. For example, many known terminal servers require 16-bit 68000 family processors to adequately support the data movement.

SUMMARY OF THE INVENTION

The present invention overcomes the problems of prior art terminal server architectures in an arrangement which provides hardware support for data received from and supplied to individual terminals and other data units resident on the LAN. A less powerful, less costly processor may therefore be used, since it is relieved of direct data movement functions.

A terminal server architecture according to the present invention comprises a central processing unit (CPU) or microcontroller, a program store, RAM memory, a LAN interface controller, as will be understood by those skilled in the art, and hardware for performing data movement between individual terminals and the LAN. The hardware is a data movement module which has the following submodules: (1) a plurality of control and status registers (CSRs); (2) a memory management module to organize memory blocks as 256 byte pages; (3) a data receiving and transmitting engine for moving data addressed to the terminal server from the LAN; (4) means for moving blocks of data; and (5) serial line interface and control means associated with each respective terminal.

The CPU and the LAN interface controller manipulate the CSRs in the data movement hardware for operating in an appropriate fashion. In accordance with bits set by the CPU and the LAN interface controller in the CSRs, the data movement module moves data between the LAN and the respective terminals in the following manner. The LAN receiving and transmitting module moves data packets destined for a selected terminal to the RAM. The slot moving means moves blocks of asynchronous data to the serial line interface. The serial line interface thereafter sends the data to the selected terminal in a controlled fashion.

Similarly, data received from a terminal on a respective serial data line is placed in the serial line interface. The slot moving means thereafter moves blocks of asynchronous characters to the RAM memory where a transmit packet of data is stored. The LAN transmitting and receiving engine moves outgoing packets of data from RAM memory to the LAN.

In this way, the CPU does not directly move data. This arrangement permits the CPU to handle only protocol, human interface, and management. Thus, a low cost CPU may be used to implement the architecture and radically reduces the overall cost of the system.

BRIEF DESCRIPTION OF THE DRAWINGS

FIG. 1 is a block diagram representation of a terminal server device implementing the architecture of the present invention.

FIGS. 2a and 2b are diagrams of the memory organization of the terminal server architecture of FIG. 1.

DETAILED DESCRIPTION OF THE PREFERRED EMBODIMENT

Figure 3:
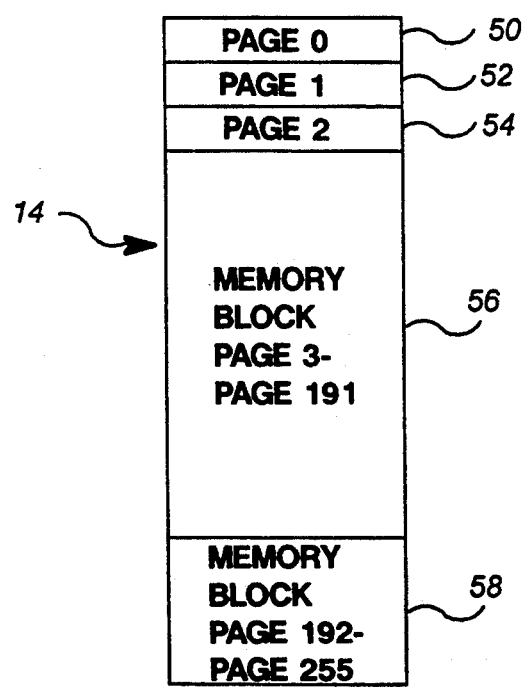
FIG. 3 is a memory map of the terminal server architecture of FIG. 1.

Generally, the present invention relates to a low cost, high efficiency terminal server architecture for transmitting data between a plurality of terminals and a local area network (LAN). The architecture of the present invention removes data transferring operations from being directly executed by the controller of the terminal server device. Accordingly, a simplified processor and other hardware to support the system replace a powerful processor and supporting hardware frequently found in prior art terminal server devices. However, the present invention supports the high data throughput required in present data network arrangements.

FIG. 1 shows the architecture according to the present invention implemented in a terminal server device 10. The terminal server 10 includes a central processing unit (CPU) or microcontroller 12, RAM memory 14, a program store or ROM memory 16, and a data movement hardware module 20, discussed in greater detail herein. The CPU 12 supplies and receives control signals to and from the data movement module 20 via a control bus 22. The CPU 12 accesses the program store 16 via an address bus 24. The CPU 12 receives data from the program store 16 via a data bus 26. By way of example, the CPU 12 may be an 80C51 family processor operating with a 10 MHz clock.

The data movement module also provides control signals to memory 14 for reading and writing data via a bus 28. Likewise, control signals are also provided between a LAN interface controller 18 such as an 82590 CSMA/CD Ethernet controller manufactured by Intel as will be understood to those skilled in the art, and the data movement module 20 via a control bus 30. The data movement module 20 specifies address information to memory 14 via an address bus 32. Data is supplied and received among the data movement module 20, terminal server memory 14, and the LAN interface controller 18 on a data bus 34.

The data movement module 20 sends data to and receives data from a plurality of terminals 36a through 36n. Each of the terminals 36a through 36n provides serial characters of data to the data movement module 20 via serial data lines 38a through 38n and receives serial characters of data from the data movement module 20 via serial lines 40a through 40n. It will be understood that the term "terminal" is used herein to denote any number of data units which asynchronously receive and transmit data.

FIG. 1 also illustrates a representation in block form of the components of the data movement module 20. Preferably, the data movement module 20 is an application specific integrated circuit arranged in a 26K sea of gates CMOS array. The actual fabrication of hardware for implementing the data movement module 20 is deemed to be within the skill of the art to which this invention pertains upon consideration of the functionality of the submodules described below. The data movement module 20 includes a plurality of control status registers (CSRs) 35, a slot mover 38 of the type known in the art for moving blocks of data as described in greater detail below, a memory management portion 40, a transmit and receive engine 42 and a plurality of serial line controllers 44a through 44n, each connecting to a respective one of the terminals 36a through 36n via the serial transmission lines 38a through 38n and serial receiving lines 40a through 40n.

FIG. 2a illustrates the organization of the terminal server memory 14 comprising 64K of RAM memory in the preferred embodiment. Data passed between the LAN and a selected terminal is placed into the terminal server memory 14 as an intermediate processing step. The memory management portion 40 partitions the RAM memory 14 into pages 46a through 46n, preferably into 256 pages having 256 bytes per page. Packets of data requiring more than one page of memory are placed into memory blocks organized as a linked list. As seen in FIG. 2b, the content of the last byte of a previous page 46a is a pointer 48 to a next page 46b in a data packet buffer in the RAM memory 14, which will be understood to those skilled in the art as a construction of linked pages. Using this pointer structure, the CPU 12 or the data movement module 20 builds a linked page list. The pointer to the first page in this buffer is contained in LAN Transmit and Receive Queue CSRs 35 as shown in Table I below.

Pointers to free memory are also contained on a stack accessed through in a Free Memory Stack CSR 36 (see Table I). Both the data movement module 20 and the CPU 12 allocate memory by popping pointers from the Free Memory Stack CSR 35, and de-allocate memory by pushing pointers back onto the Free Memory Stack CSR.

FIG. 3 shows a memory map according to the preferred embodiment. As shown in FIG. 3, page zero 50 of memory is mapped to the control status registers (CSRs) 35. The CPU 12 asserts command signals that set bits in selected bit positions in the data fields of the CSRs 35 to direct the data movement module 20 to perform specified operations. The data movement module 20 also sets appropriate bits in the CSRs 35 to inform the CPU 12 of status and other information during movement operations as described below. Likewise, the LAN interface controller sets bits in the CSRs 35 to request data transmission to the terminal server 10 and to acknowledge receipt of data supplied from the terminal server 10. The following table shows the CSRs 35 provided and their function according to the preferred embodiment:

TABLE I

| CSR | Application |
|---|---|
| CSRs For Controlling Transmission Of Data | |
| 1. LAN Interface Controller Initialize | Initializes LAN Interface Controller 18 |
| 2. LAN Interface Controller Command and Status | Provides bits for controlling the LAN Interface Controller 18 |
| 3. LAN Transmit Queue | Stores pointers to pages in memory containing data packets waiting to be transmitted. |
| 4. LAN Receive Queue | Stores pointers to pages in memory containing data packets that have been |

TABLE I-continued

| CSR | Application |
|---|---|
| | received. |
| 5. Free Memory Stack | Stores pointers to free pages in memory. |
| 6. DMA Transmit and Receive Enable and Status | Arms the DMA engine 42 for receiving and transmitting data to terminal server memory 14, and reports status. |
| CSRs For Slot Move Operations | |
| 1. Slot Move Counter | Stores number of bytes to move in a slot move operation. |
| 2. Slot Move Destination HI | Stores page in memory to move to in slot move operation. |
| 3. Slot Move Destination LO | Stores offset memory location in page to move to. |
| 4. Slot Source HI | Stores page in memory to move from. |
| 5. Slot Source LO | Stores offset memory location in page to move from. |
| CSRs For Controlling Transmission Of Data Between Memory And Terminals | |
| 1. Flow Control CSR | Enables/disables serial ports for serial data transmission and reception. |
| 2. Universal Asynchronous Receiver/Transmitter (UART) | Controls baud rate and loopback modes for serial transmission from the terminal server 10 to selected terminals. |
| 3. Receive FIFO | Stores characters received from UART in 1024 byte FIFO's. |
| 4. Low Receive Count | Stores low order byte of character count in receive FIFO. |
| 5. High Receive Count | Stores 2 most significant bits of character count in receive FIFO. |
| 6. Transmit FIFO | Stores characters waiting to be transmitted to UART's in 1024 byte FIFO's. |
| 7. Low Transmit Count | Stores low order byte of character count in transmit FIFO. |
| 8. High Transmit Count | Stores 2 most significant bits of character count in transmit FIFO. |

FIG. 3 also illustrates the allocation of the remaining pages of memory 14. Page one 52 of memory 14 is used to store a LAN receive queue. The LAN receive queue is a linear list which stores pointers to data packets that have been received. Page two 54 of memory stores a LAN transmit queue. While the CPU 12 reads or writes to the Transmit Queue CSR and the Receive Queue CSR, pages one and two of memory represent the actual storage location for the transmit queue and receive queue pointers. A memory block 56 including pages three through are freely accessible for storage and retrieval of data packets received from the LAN. A memory block 58 including pages 192 through 255 are used for storage and retrieval of data received from respective terminals via the serial line input/output FIFOs 44a through 44n.

The data movement module 20 operates with a 300 nanosecond (ns) memory cycle for reading from or writing to the memory 14. The terminal server 10 further operates on a 2400 ns time consisting of eight memory cycles. The CPU 12 addresses the memory 14 in a transparent, wait-free access fashion according to the following priority scheme: (1) the CPU 12 has first priority; (2) the LAN transmission and receive engine second; (3) the serial line FIFOs 44a through 44n third; and (4) the slot mover 38 last. Accordingly, a large bandwidth is provided for the data movement module 20 for accessing the memory 14 before returning control of the data bus 32 and address bus 34 to the CPU 12.

Figure 4A:
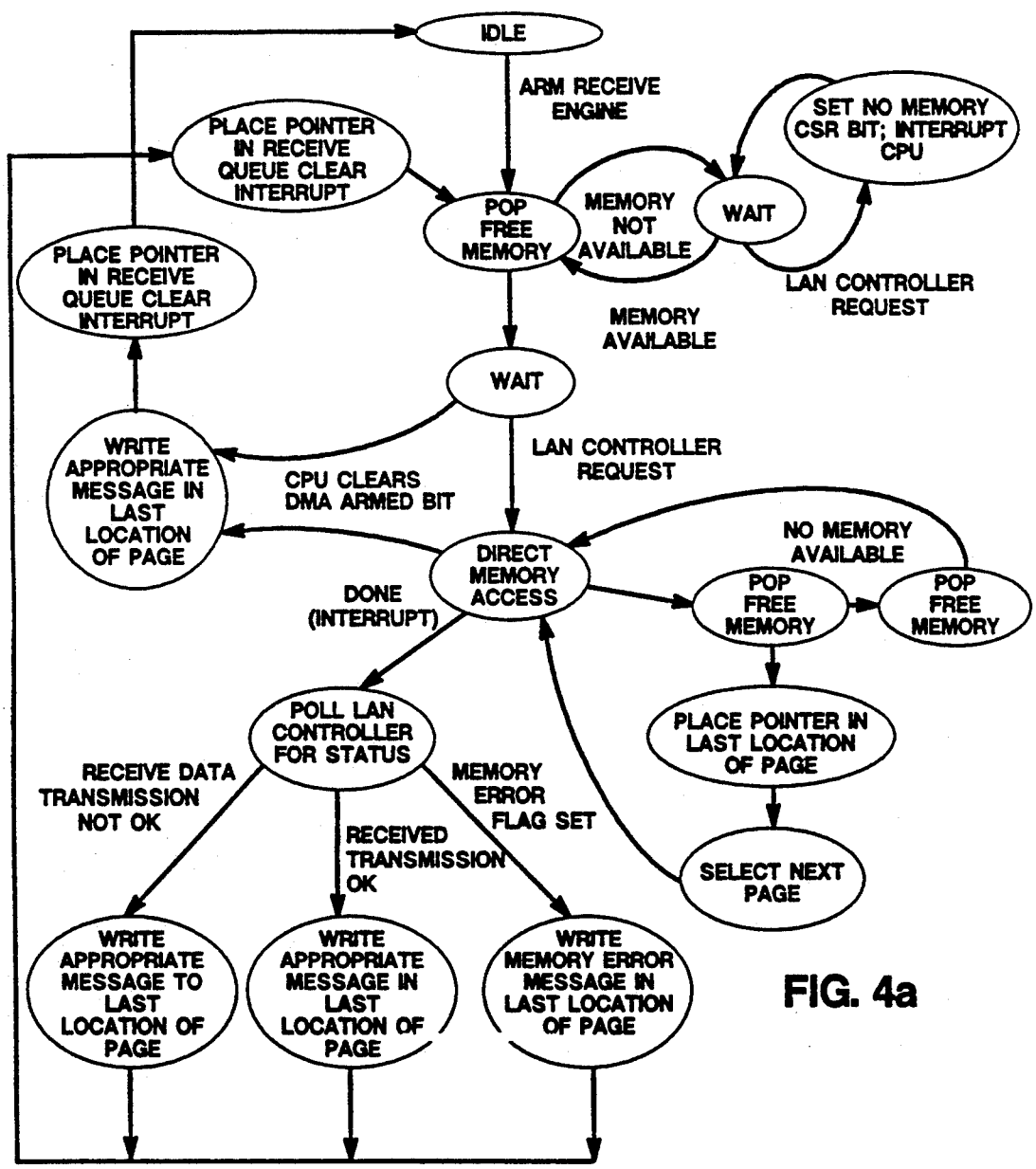
FIG. 4a is a flow diagram of a transfer of data between a local area network (LAN) interface device and a terminal server device memory, shown receiving data from the LAN.
Figure 4B:
FIG. 4b illustrates a data field for a LAN interface controller control status register.

The DMA transmit and receive engine 42 performs direct memory access transfers of data between the LAN interface controller 18 and memory 14 for both receive and transmit operations. FIG. 4a shows the sequence of operations for receiving data packets from the LAN and thereafter placing the data into memory 14. The CPU 12 enables data packet reception by "arming" the DMA receive engine 42. As seen in FIGS. 4b, the CPU 12 initially arms the DMA receive engine 42 by asserting a command signal that sets an "arm" bit 60 in the second bit position in the data field for the DMA Transmit and Receive CSR 35a. The CPU 12 thereafter asserts a command signal that sets a bit in the data field of the LAN interface controller CSR specifying an appropriate data channel as will be understood to those skilled in the art.

When the LAN receive engine 42 is armed, the receive engine 42 immediately pops the pointer to the next available free memory page from the free memory stack CSR. The LAN interface controller 18 thereafter asserts a direct memory access (DMA) request control signal, which results in the setting of a selected bit in the data field of the LAN Interface Controller Status CSR (Table I). The DMA receive engine 42 uses the pointer corresponding to the free memory page previously popped from the Free Memory Stack CSR (see Table I), and moves the packet directly from the LAN interface controller 18 to that page.

FIG. 4a also illustrates a reception sequence wherein the data packet size intended to be received exceeds 255 bytes. The receive engine 42 allocates another free page of memory from the stack by popping the address of the next succeeding page of available memory from the Free Memory Stack CSR (Table I). The receive engine 42 thereafter places a pointer to the next succeeding page in the last location (255) of the current page as shown in FIG. 2b. The receive engine 42 continues transferring data to the new page. When no free pages remain on the Free Memory Stack, the receive engine 42 writes an appropriate message to the location in the last page of the packet.

As shown in FIG. 4a and 4b, the CPU 12 may disarm the receive engine 42 during packet reception. The CPU 12 disarms the LAN receive engine 42 by asserting a command signal that clears the "arm" bit 60 in the DMA Transmit and Receive CSR 35a. The DMA receive engine 42 writes a different message to location 255 in the last page of the packet received before the DMA receive engine 42 was disarmed.

Upon completion of a packet reception, the LAN interface controller 18 writes a completion message to memory and asserts an interrupt signal to the CPU 12. When the data reception has completed, the DMA receive engine 42 reads the LAN Interface Controller Status CSR (Table I), and writes a code into location 255 of the last page in the data packet buffer. The DMA receive engine 42 thereafter clears the LAN interface controller interrupt. The message written by the DMA receive engine 42 corresponds to the following conditions: (1) data received OK; (2) arm bit cleared while receiving a packet; (3) memory could not be allocated; or (4) receive error detected.

The DMA receive engine 42 thereafter places a pointer to the address of the first page of the location of the data packet in the Receive Queue CSR (Table I). The CPU 12 accesses the receive queue pointers by reading the Receive Queue CSR. Once the CPU 12 reads the pointer, it is removed from the queue. The CPU 12 uses the linked list memory structure to access all memory pages in the packet as described above. As noted above, the last memory location of the last page in the buffer containing the data packet contains status information supplied by the DMA receive engine 42. The CPU 12 processes this location, and thereafter redirects the packet of data received in memory 14 to a selected serial line controller 44a through 44n, as described below. When processing is complete for a given memory block, the CPU 12 places it back on the free memory stack by writing the pointer to the Free Memory Stack.

FIG. 4a also illustrates the situation in which the DMA receive engine 42 is initially armed and no free memory is available. When no free memory is available in the Free Memory Stack CSR, the DMA receive engine 42 asserts a command signal to set the bit in a "no memory" bit position in the data field for the DMA Transmit and Receive CSR. Upon receipt of this information, the CPU 12 is interrupted. The CPU 12 polls the no memory bit to determine the cause of the interrupt, and thereafter takes appropriate action.

Figure 5:
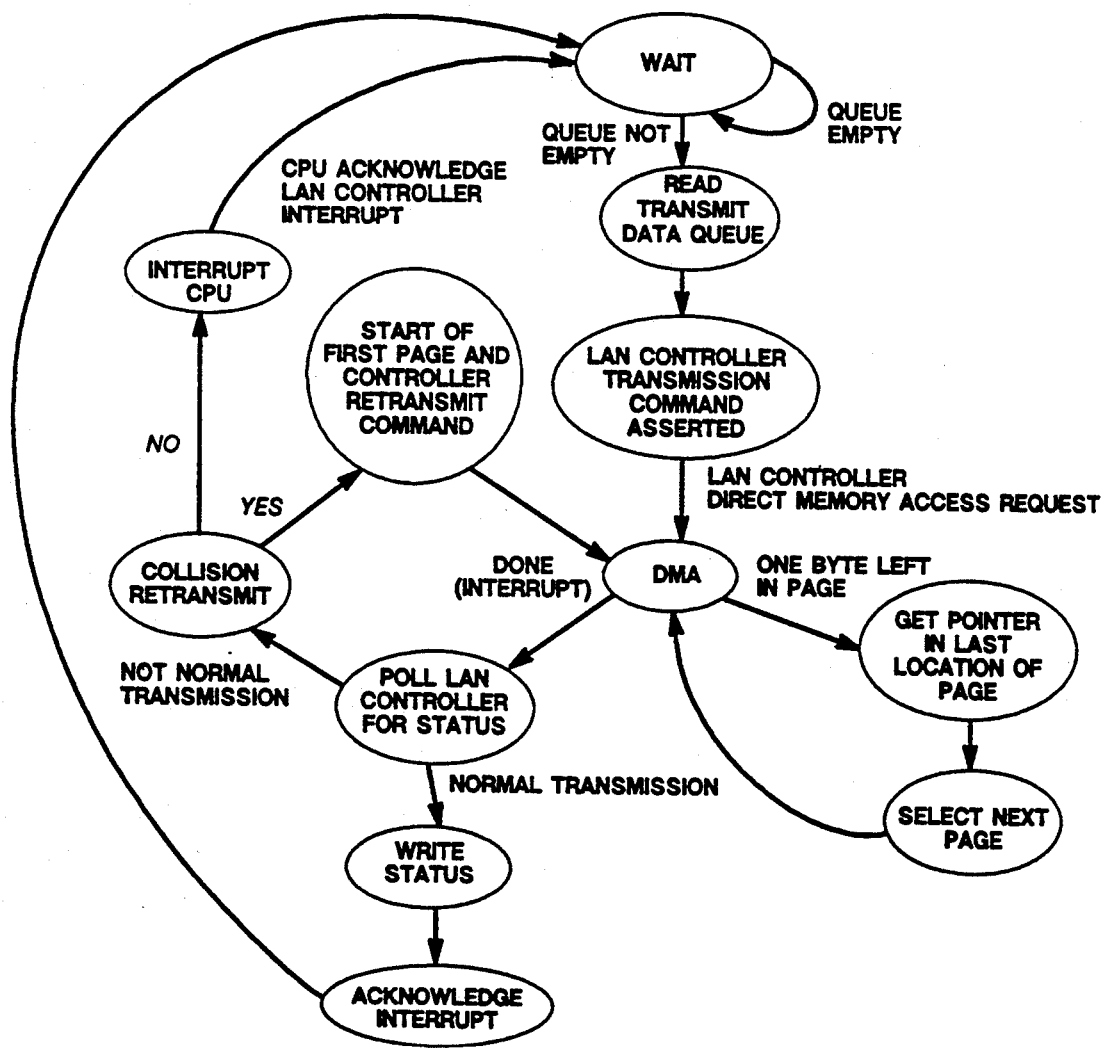
FIG. 5 is a flow diagram showing the transmission of data from the terminal server device memory to the LAN.

Data is transmitted from the terminal server 10 to the LAN in the sequence of operations shown in FIG. 5. The CPU 12 initiates a transmit operation by placing a pointer to the first page of a packet on the Transmit Queue. The CPU 12 also asserts a command signal to set a selected bit in the data field of the DMA Transmit and Receive CSR 35a to "arm" the engine 42. The CPU 12 thereafter organizes the data ready to be transmitted into a linked list of pages, with pointers to subsequent pages in the last location (location 255) of the previous page. Next, the DMA transmit engine 42 reads the contents of the Transmit Queue CSR 36. The DMA transmit engine 42 thereafter issues a command signal for requesting transmission to the LAN control interface controller 18 by writing a transmit command message to the LAN Interface Control CSR (Table I). Upon receipt of the data transmission request, the LAN Interface Controller 18 asserts a direct memory access request by setting a selected bit in the data field of the LAN Interface Control CSR (Table I).

The DMA transmit engine 42 thereafter sequences through the Transmit Queue and automatically transmits all the packets listed in the Transmit Queue CSR. When the data packet transmitted to the LAN Interface Controller 18 exceeds one page, the LAN transmit engine 42 retrieves a pointer to the location of the next succeeding page of the data packet in memory 14 from the Transmit Queue CSR. Upon selection of the address of the next succeeding page, the next succeeding page is moved from memory 14 to the LAN Interface Controller 18.

The LAN Interface Controller 18 supplies an interrupt command signal to the DMA transmit engine 42 when transmission of a packet of data is complete. In addition the LAN Interface Controller 18 asserts a command signal to selected bits in the LAN Interface Controller. The LAN transmit engine 42 thereafter polls the contents of the LAN Interface Controller CSR. Upon the occurrence of a normal transmission, the DMA transmit engine 42 writes its current status in the last byte of the last page of the buffer, and clears the interrupt.

However, when the contents of the LAN Interface Controller CSR indicate an unsuccessful transmission to the LAN Interface Controller 18, the DMA transmit engine 42 determines whether a collision of data packets occurred. If a collision occurred, the DMA transmit engine 42 sequences to the address corresponding to the first page of the data packet. The DMA transmit engine 42 also supplies a retransmit command signal to the LAN Interface Controller 18 by setting a selected bit in the LAN Interface Controller CSR. Data is thereafter supplied to the LAN Interface Controller 18 as described above.

If a transmission failure otherwise occurs, the DMA transmit engine asserts a command signal to interrupt control of the CPU 12. The CPU 12 thereafter acknowledges the interrupt signal asserted by the LAN Interface Controller 18.

Figure 6:
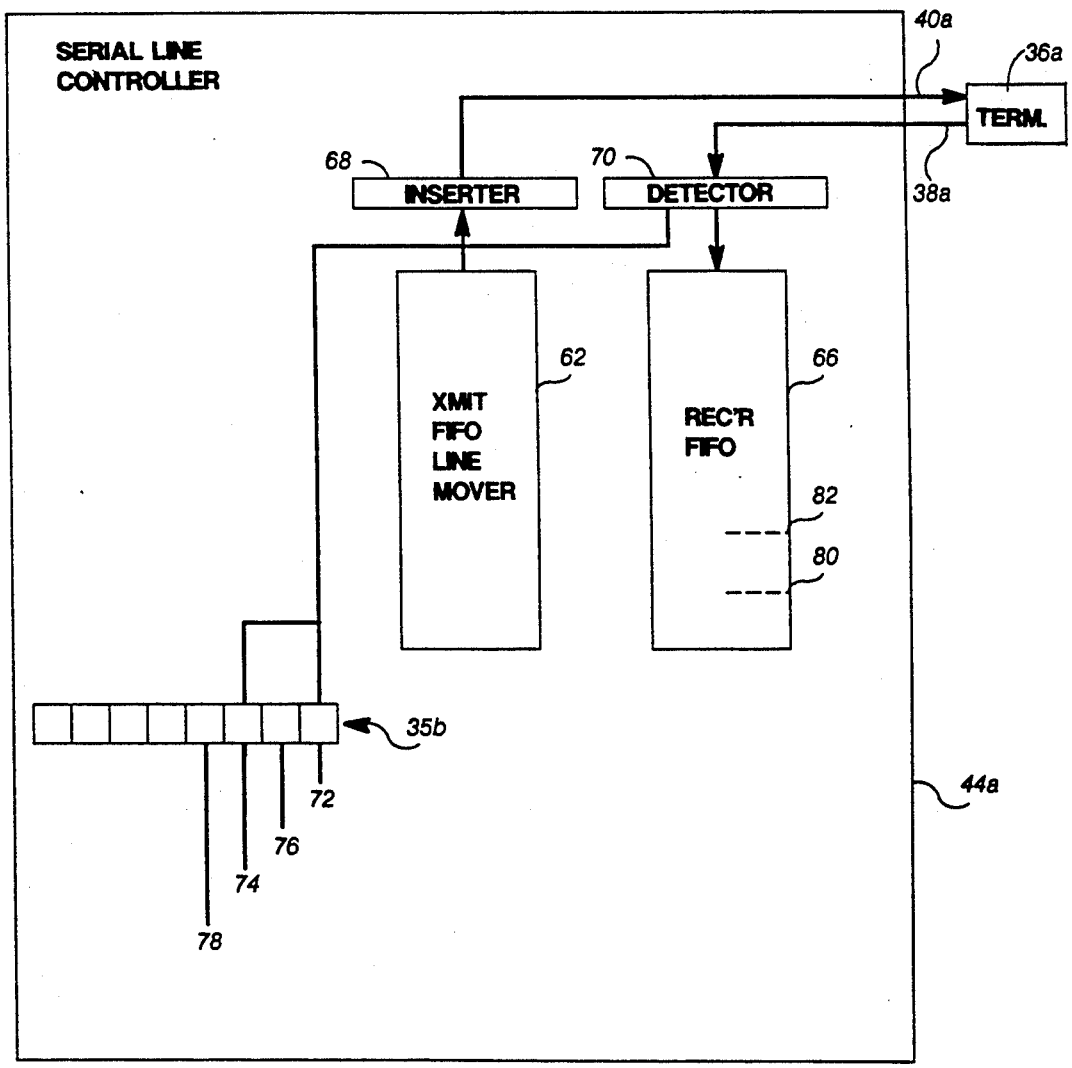
FIG. 6 is a diagrammatic representation illustrating the movement of data between the serial line interface and control modulus of the terminal server and a respective terminal.

FIG. 6 shows a block diagram for one of the plurality of serial line controllers 44a through 44n. The serial line controller 44a provides a Universal Asynchronous Receive and Transmit (UART) function as will be understood to those skilled in the art. By way of example, the CPU 12 may provide command signals to set appropriate bit positions the UART CSR data field (as described in Table I) to control the transmission rate as well as other parameters. In addition, the CPU 12 polls selected bit positions in the UART CSR to detect data framing errors and other status signals provide by the serial line controller 44a as is well known in the art.

The serial line controller 44a includes a first-in first-out (FIFO) transmission serial line mover 62 and a receive FIFO 66. The transmission serial line mover 62 provides asynchronous characters of data to a serial line inserter 68, which in turn, provides data to the terminal 36a via the line 40a. In a similar fashion, data supplied from the terminal 36a is received by a serial line transmission detector 70 on the line 38a. The detector 70 thereafter supplies characters of data to the receive FIFO 66. In addition, the detector 70 senses either a transmission on ("XON") or a transmission off ("XOFF") signal provided by the terminal 36a for a data transmission request on the line 38a. Likewise, the inserter 68 supplies a data transmission request to the terminal 36a via the line 40a.

FIG. 6 also illustrates the flow control CSR 35b provided for the singular serial line controller 44a. The remaining serial line controllers 44b through 44n corresponding to the remaining terminals 36b through 36n connected with the terminal server 10 perform in exactly the same manner.

Figure 7A:
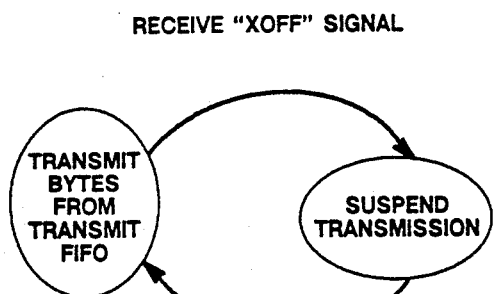
FIGS. 7a, 7b, 8a and 8b are diagrammatic representations for control for transmission of data between the terminal server device and a terminal.
Figure 7B:
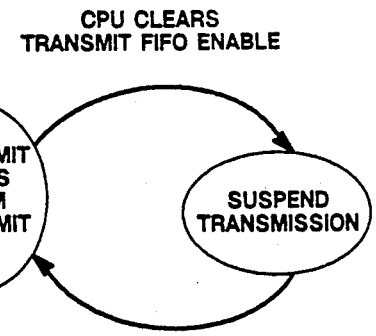

The method for enabling the serial line controller 44a to process either a transmission on ("XON") or transmission off ("XOFF") signal received from the terminal 36a is also shown in FIG. 6, and in FIGS. 7a and 7b. In order to effect transmission from the serial line controller 44a to the terminal 36a, the CPU 12 asserts a command signal to set a bit in the first bit position 72 of the Flow Control CSR 35b. Thereafter, the reception of an XON command signal from the terminal 36a sets a bit in the third bit position 74 of the Flow Control CSR 35b to enable the transmission serial line mover 62 to pass characters of data to the terminal 36a via the line 40a. As shown in FIG. 7b, the CPU 12 may also assert a command signal to set the bit position 74 of the Flow Control CSR 35b for instructing the serial line mover 62 to begin transmission.

On the other hand, when the terminal 36a sends an XOFF signal, data transmission from the serial line mover 62 to the terminal 36a is suspended. Likewise, the CPU 12 may assert a command signal to clear the bit position 74 to terminate the data transmission. If enabled in the direction of the terminal server to the terminal, and the serial line controller 44a concurrently receives an XOFF signal from the terminal, character output is discontinued until either (1) an XON signal is received, or (2) the CPU 12 changes the flow control state.

Figure 8A:
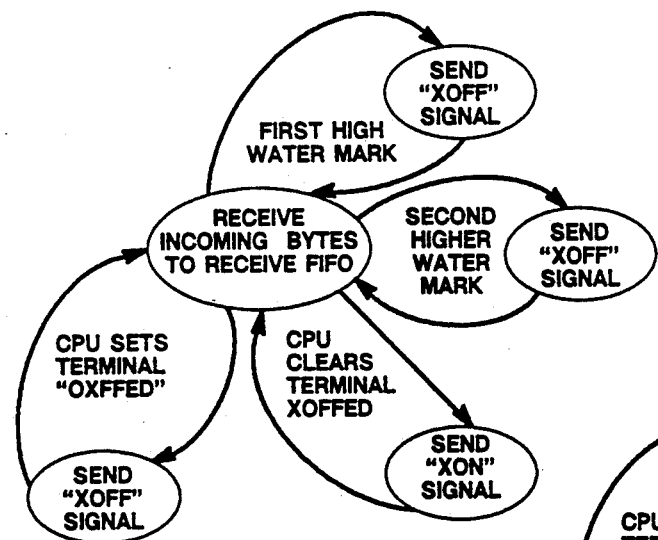
Figure 8B:
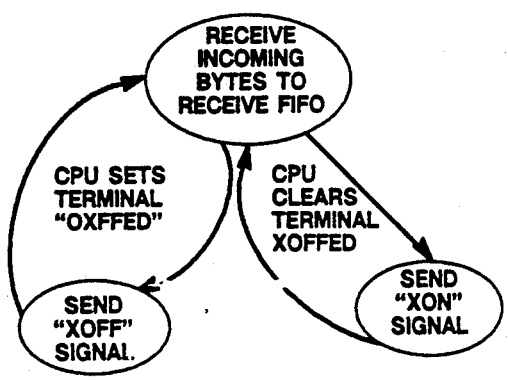

FIGS. 8a and 8b illustrate data movement from the terminal 36a to the receive FIFO 66. The CPU 12 asserts a command signal to set the bit corresponding to a receive enable bit position 76 in the Flow Control CSR 35b. The receive FIFO 66 thereafter receives characters of data from the terminal 36a via the line 38a. When the amount of data received exceeds a first "high water" mark 80, corresponding to the number of locations in the receive FIFO 66 (for example 896 bytes in the preferred embodiment), the serial line controller 44a generates a first command "XOFF" signal to the terminal 36a. The serial line controller 44a generates a second command "XOFF" signal to the terminal 36a when the amount of data received exceeds a second "high water" mark 82, corresponding to the number of locations filled with data in the receive FIFO 66 (for example 960 bytes).

The CPU 12 thereafter asserts a command signal to set the bit corresponding to a Terminal XOFFed bit position 78 in the flow Control CSR 35b. Upon receipt of the Terminal XOFFed signal, the terminal 36a terminates data transmission to the receive FIFO 66. The CPU 12 thereafter directs data in the receive FIFO 66 to memory 14 by asserting command signals to perform a slot move operation, as described below. The CPU 12 must thereafter supply a command signal to clear the Terminal XOFFed bit. This command signal causes the serial line inserter 68 to supply a data transmission request (an "XON" command) signal to the terminal 36a via the line 40a, to allow retransmission by the terminal 36a.

Turning back to FIG. 1, the slot mover 38 provides rapid movement of blocks of data as will be understood by those skilled in the art for moving data to and from one memory block to another, or to and from CSRs. For example, slot mover applications include moving slot data into and out of serial line FIFO's, loading or unloading, transmit or receive buffers, or configuring the LAN controller 18. In the preferred embodiment, the slot mover 38 is restricted to transfers to and from a single page of memory.

To perform a slot movement of data, the CPU 12 generates the appropriate command signals corresponding to a source address, destination address and number of bytes to be moved. In particular, the CPU 12 specifies the appropriate destination page and location within the page by providing command signals to set selected bits in the slot Move Destination HI and LO CSRs (Table I). Similarly, the desired source page and location within the page are specified by the CPU 12 in the Slot Source HI and LO CSRs. The CPU 12 writes such information to the Slot Move CSRs as shown in Table I. The source and destination CSRs provide a page number for movement of the block.

Accordingly, there has been described herein a terminal server architecture providing a relatively inexpensive cost for implementation thereof. The terminal server architecture relieves a microcontroller of direct data movements. Instead, the CPU manipulates pointers to data which direct supporting logic to perform actual data moves. It will be understood that various changes in the details and arrangements of the implementation described herein will occur to those skilled in the art without departing from the principle and scope of the present invention. Thus, while the invention has been described with reference to the presently contemplated best mode for practicing the invention, it is intended that this invention only be limited by the scope of the appended claims.

What is claimed is:

1. A method for passing data from a local area network (LAN) to selected one of a plurality of terminals using a terminal server having central processing means, data movement means for performing selected data movement operations substantially independent of said central processing means, memory and serial interface means, said serial interface means connected with each of said plurality of terminals, and said local area network (LAN) being connected to said terminal server, said method comprising the steps of:

generating first control signals from said central processing means, said first control signals identifying selected locations in said memory;

providing said first control signals to said data movement means;

generating second control signals from said data movement means;

providing said second control signals to said memory for moving said data from said LAN to said selected locations in said memory;

generating third control signals from said data movement means; and providing said fourth control signals to said serial interface means for moving said data from said serial interface means to at least one of said plurality of terminals.

2. A method for passing data from a selected one of a plurality of terminals to a local area network (LAN) using a terminal server having central processing means, data movement means for performing selected data movement operations substantially independent of said central processing means, memory and serial interface means, said serial interface means connected with each of said plurality of terminals, and said local area network (LAN) being connected to said terminal server, said method comprising the steps of:

generating first control signals from said central processing means, said first control signals identifying selected locations in said memory;

providing said first control signals to said data movement means;

generating second control signals from said data movement means;

providing said second control signals to said serial interface means for moving said data from said terminal to said serial interface means;

generating third control signals from said data movement means;

providing said third control signals to said memory for moving said data from said serial interface means to said selected locations;

generating fourth control signals from said data movement means; and providing said fourth control signals to said LAN and said memory for moving said data from said selected locations in said memory to said LAN.

3. Apparatus for moving data between a local area network and a selected one of a plurality of terminals comprising:

- memory means for storing data passed between said local area network and said terminals;
- central processing means for providing command signals identifying selected locations in said memory means;
- data movement means connected to said central processor means, said local area network and said plurality of terminals;
- said data movement means having control status register means with a plurality of data fields for receiving said command signals from said central processing means and storing said command signals;
- data transmission and receiving means responsive to said command signals stored in a first one of said data fields of said control status register means for moving data between said local area network and said memory means;
- memory management means responsive to said command signals stored in a second one of said data fields of said control status register means for organizing data received from said data transmission in a linked list in said memory;
- serial line interface means responsive to said command signals stored in a third one of said data fields of said control status register means for moving data from said memory means to said terminal; and
- slot moving means responsive to said command signals stored in a fourth one of said data fields of said control status register means for moving data between said serial line interface means and said memory means and between said data transmission and receiving means and said local area network.

4. The terminal server of claim 3 wherein said memory means comprises a plurality of pages, each page comprising a plurality of memory locations, the last memory location of each page being a pointer to the first memory location to a next succeeding page, at least one of said pointers stored in at least one of said data fields.

5. A terminal server for transmitting data between a local area network and a selected one of a plurality of terminals comprising:

- memory means connected to said local area network and said terminals for storing data passed between said local area network and said terminals;
- central processing means for providing command signals identifying selected locations in said memory means;
- data movement means connected to said central processor means and said memory means and comprising:
- control status register means having a plurality of data fields for receiving said command signals from said central processing means and storing said command signals;
- data transmission and receiving means responsive to said command signals stored in a first one of said data fields of said control status register means for moving data between said local area network and said memory means;
- memory management means responsive to said command signals stored in a second one of said data fields of said control status register means for organizing data received from said data transmission in a linked list in said memory;
- serial line interface means responsive to said command signals stored in a third one of said data fields of said control status register means for moving data from said memory means to said terminal; and
- slot moving means responsive to said command signals stored in a fourth one of said data fields of said control status register means for moving data between said serial line interface means and said memory means and between said data transmission and receiving means and said local area network.

* * * * *